United States Patent
Seo et al.

(10) Patent No.: US 11,790,476 B2
(45) Date of Patent: Oct. 17, 2023

(54) METHOD, APPARATUS, AND PROGRAM FOR PREVENTING CONTENT FROM LEAKING OUT

(71) Applicant: NAVER WEBTOON LTD., Seongnam-si (KR)

(72) Inventors: Choong Hyun Seo, Seongnam-si (KR); Sang Min Park, Seongnam-si (KR); Jin Seo Lee, Seongnam-si (KR); Yo Seob Lee, Seongnam-si (KR); Seung Ik Kim, Seongnam-si (KR)

(73) Assignee: NAVER WEBTOON LTD., Seongnam-si (KR)

( * ) Notice: Subject to any disclaimer, the term of this patent is extended or adjusted under 35 U.S.C. 154(b) by 339 days.

(21) Appl. No.: 17/121,988

(22) Filed: Dec. 15, 2020

(65) Prior Publication Data

US 2021/0192671 A1 Jun. 24, 2021

Related U.S. Application Data

(63) Continuation of application No. PCT/KR2019/007070, filed on Jun. 12, 2019.

(30) Foreign Application Priority Data

Jun. 19, 2018 (KR) ........................ 10-2018-0070423

(51) Int. Cl.
*G06T 1/00* (2006.01)
*G06T 11/00* (2006.01)
*G06T 11/60* (2006.01)

(52) U.S. Cl.
CPC .......... *G06T 1/0035* (2013.01); *G06T 11/001* (2013.01); *G06T 11/60* (2013.01)

(58) Field of Classification Search
CPC .......... G06F 21/16; G06F 21/12; G06F 23/24; G06F 21/31; G06F 21/60; G06Q 30/00; G06Q 50/06; G06T 1/06; H04N 1/387
See application file for complete search history.

(56) References Cited

U.S. PATENT DOCUMENTS 6,176,427 B1 * 1/2001 Antognini ........ G06K 19/06037
235/494
8,259,937 B2 * 9/2012 Tsukada ................ G06F 16/958
380/201

(Continued)

FOREIGN PATENT DOCUMENTS

JP 2007102735 A 4/2007
JP 2008283479 A 11/2008

(Continued)

OTHER PUBLICATIONS

Office action issued in Korean Application No. 10-2018-0070423, dated Oct. 17, 2019.

(Continued)

*Primary Examiner* — Abderrahim Merouan
(74) *Attorney, Agent, or Firm* — Greer Burns & Crain Ltd.

(57) ABSTRACT

Provided is an apparatus for preventing a content leak, including: a view request receiving unit for receiving a content view request for view target content to obtain content viewer information; a marker form determining unit for determining a marker form regarding a location of the view target content where a marker for each character is added, according to the content viewer information; a marking method determining unit for determining a marking method regarding a type or order of markers added to the marker form; and a modified content generating unit for generating modified content by adding, to the view target (Continued)

content, one or more markers corresponding to the content viewer information, based on the marker form and the marking method.

16 Claims, 12 Drawing Sheets

(56) References Cited

U.S. PATENT DOCUMENTS

| | | | | |
|---|---|---|---|---|
| 9,613,455 | B1* | 4/2017 | Nelson | G06V 20/10 |
| 10,915,980 | B2* | 2/2021 | Li | G06T 1/0028 |
| 2002/0133705 | A1* | 9/2002 | Tagashira | H04L 63/08 |
| | | | | 380/232 |
| 2003/0179913 | A1* | 9/2003 | Murase | G06V 40/30 |
| | | | | 382/119 |
| 2005/0050446 | A1* | 3/2005 | Miura | G06Q 30/06 |
| | | | | 380/203 |
| 2010/0154034 | A1* | 6/2010 | Tsukada | G06Q 10/10 |
| | | | | 715/255 |
| 2013/0335784 | A1* | 12/2013 | Kurtz | H04N 1/32331 |
| | | | | 358/3.28 |
| 2017/0262145 | A1* | 9/2017 | Isoyama | G06F 21/00 |
| 2017/0353476 | A1* | 12/2017 | Gordon | G06F 21/566 |
| 2021/0192671 | A1* | 6/2021 | Seo | G06F 21/16 |
| 2021/0224223 | A1* | 7/2021 | Muramoto | G06Q 40/02 |

FOREIGN PATENT DOCUMENTS

| | | |
|---|---|---|
| KR | 1020090122606 A | 12/2009 |
| KR | 1020100007616 A | 1/2010 |
| KR | 1020110123393 A | 11/2011 |
| KR | 1020140072321 A | 6/2014 |
| KR | 1020170105755 A | 9/2017 |

OTHER PUBLICATIONS

Notice of allowance issued in Korean Application No. 9-5-2020-023550283, dated Apr. 1, 2020.
ISR issued in Int'l. Application No. PCT/KR2019/007070, dated Sep. 20, 2019.
Office action issued in corresponding Japanese Patent Application No. 2020-571584, dated Feb. 15, 2022.

\* cited by examiner

METHOD, APPARATUS, AND PROGRAM FOR PREVENTING CONTENT FROM LEAKING OUT

CROSS-REFERENCE TO RELATED APPLICATIONS

This is a continuation application of International Application No. PCT/KR2019/007070 filed Jun. 12, 2019, which claims the benefit of Korean Patent Application No. 10-2018-0070423 filed Jun. 19, 2018.

BACKGROUND OF THE INVENTION

Field of Invention

The present disclosure relates to a content leak preventing method, apparatus, and program, and more particularly, to a content leak preventing method, apparatus, and program for easily detecting a content leaker by adding a marker indicating viewer information to content.

Description of Related Art

With the rapid development of online content markets, content leak and unauthorized illegal duplication markets resulting from easiness of duplication of digital data are also increasing day by day. A method of adding a watermark to content, or the like is being used to prevent unauthorized duplication of the content, but the watermark decreases visibility of the content, deleting of the watermark does not require a difficult technique, and it is difficult to detect a leaker by using the watermarked content.

Meanwhile, in general, cartoons refer to drawings that concisely and humorously draw or exaggeratedly show the appearances of people, animals, objects, etc., and provide reading materials with humor, satire, or certain storylines by inserting short texts. Recently, online cartoons have been released and many users are getting pleasure and information through reading cartoons. For example, KR 10-2011-0123393 (published on Nov. 15, 2011) discloses a technology for providing a cartoon in a form of mobile digital content through a direct online transaction.

BRIEF SUMMARY OF THE INVENTION

An object of the present disclosure is to add a marker indicating viewer information to content such that a content leaker may be easily detected.

Another object of the present disclosure is to prevent a viewer from easily detecting a marker indicating viewer information.

According to an embodiment of the present disclosure, an apparatus for preventing a content leak includes: a view request receiving unit for receiving a content view request for view target content to obtain content viewer information; a marker form determining unit for determining a marker form regarding a location of the view target content where a marker for each character is added, according to the content viewer information; a marking method determining unit for determining a marking method regarding a type or order of markers added to the marker form; and a modified content generating unit for generating modified content by adding, to the view target content, one or more markers corresponding to the content viewer information, based on the marker form and the marking method.

The apparatus may further include a marker form shifting unit for shifting the location for adding the marker for each character of the marker form.

A value for shifting the location may be determined based on an episode number of the view target content The modified content generating unit may generate a marker target character string for generating the one or more markers, based on the content viewer information, wherein the marker target character string may be a character string in which the number of characters of a viewer identification (ID) is added to the viewer ID.

A boundary of the marker form may be spaced apart from a boundary of a cut of the view target content by a pre-set value or greater such that a size of the marker form is smaller than a size of the cut of the view target content.

A color of the one or more markers may be determined based on a color value corresponding to a location of the view target content where the one or more markers are added.

The marker form determining unit may determine the marker form such that the marker form assigns a location where a marker for each content attribute is added.

The marking method determining unit may determine the order such that markers based on the content viewer information are repeatedly added to cuts of the modification target content while determining the order such that there is a cut to which a marker is not added is present between repeated pieces of the content viewer information.

The marker form may be a marker form assigning two or more corresponding marker locations for each character.

The apparatus may further include a modified content providing unit for providing the modified content in response to the content view request.

The view target content may be content including a plurality of cuts and the modified content generating unit may add a marker corresponding to each character included in the marker target character string based on the content viewer information to each of the plurality of cuts included in the view target content.

According to an embodiment of the present disclosure, a method of preventing a content leak includes: receiving a content view request for view target content to obtain content viewer information; determining a marker form regarding a location of the view target content where a marker for each character is added, according to the content viewer information; determining a marking method regarding a type or order of markers added to the marker form; and generating modified content by adding, to the view target content, one or more markers corresponding to the content viewer information, based on the marker form and the marking method.

The method may further include shifting the location for adding the marker for each character of the marker form.

The generating of the modified content may include generating a marker target character string for generating the one or more markers, based on the content viewer information, wherein the marker target character string may be a character string in which the number of characters of a viewer identification (ID) is added to the viewer ID.

A color of the one or more markers may be determined based on a color value corresponding to a location of the view target content where the one or more markers are added.

The marker form may be a marker form assigning two or more corresponding marker locations for each character.

The view target content may be content including a plurality of cuts and the generating of the modified content may include adding a marker corresponding to each character included in the marker target character string based on the content viewer information to each of the plurality of cuts included in the view target content.

Also, provided is a computer program recorded on a computer-readable recording medium to execute the method according to the present disclosure.

According to the present disclosure, because a marker indicating viewer information is added to leaked content, a content leaker may be easily detected by using the added mark.

According to the present disclosure, because a viewer is unable to easily detect how a marker is added and the added mark, the marker may be prevented from being removed by a leaker.

DETAILED DESCRIPTION OF THE INVENTION

Figure 1:
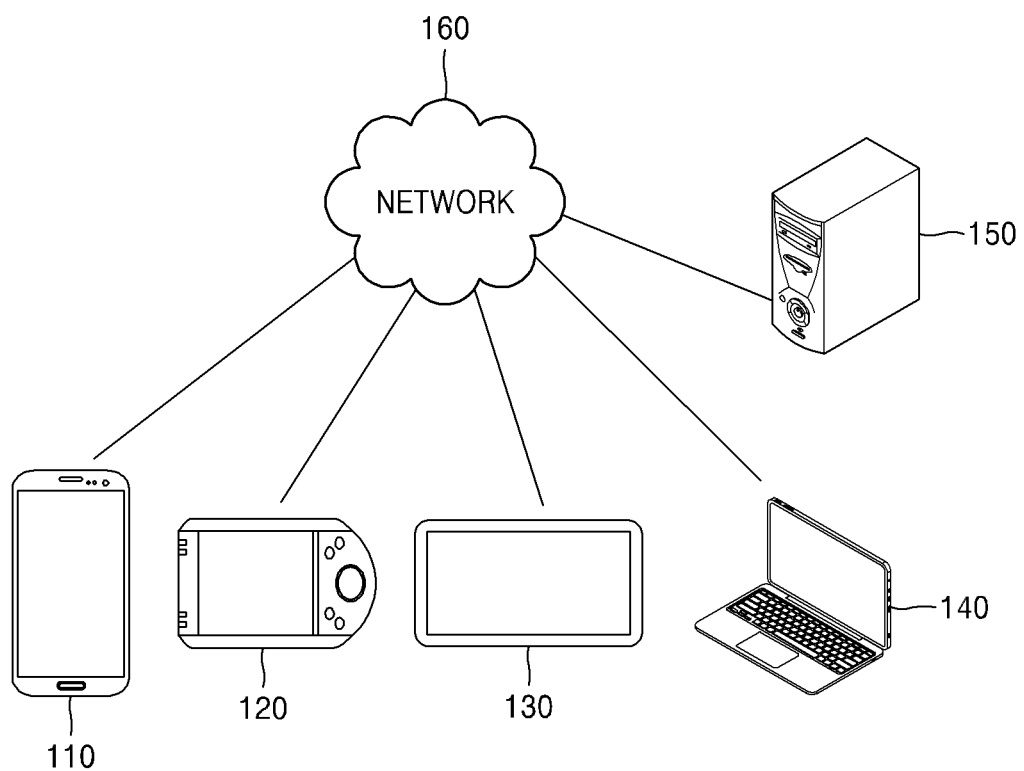
FIG. 1 is a diagram showing an example of a network environment according to an embodiment of the present disclosure.

The detailed description of the present disclosure to be described below refers to the accompanying drawings, which illustrate specific embodiments in which the present disclosure may be practiced. These embodiments are described in sufficient detail to enable one of ordinary skill in the art to practice the present disclosure. It is to be understood that various embodiments of the present disclosure are different from each other, but need not be mutually exclusive. For example, specific shapes, structures, and characteristics described herein may be changed from one embodiment to another embodiment and implemented without departing from the spirit and scope of the present disclosure. In addition, it should be understood that positions or arrangements of individual elements in each embodiment may be changed without departing from the spirit and scope of the present disclosure. Accordingly, the detailed description described below is not implemented in a limiting sense, and the scope of the present disclosure may encompass the scope claimed by claims and all scopes equivalent thereto. In drawings, the like reference numerals denote the same or similar elements over various aspects.

FIG. 1 is a diagram showing an example of a network environment according to an embodiment of the present disclosure.

The network environment of FIG. 1 includes a plurality of user terminals 110 through 140, a server 150, and a network 160. FIG. 1 is an example for describing the present disclosure and the number of user terminals or the number of servers is not limited to that shown in FIG. 1.

The plurality of user terminals 110 through 140 may be fixed terminals or mobile terminals implemented as computing devices. The plurality of user terminals 110 through 140 may be, for example, smart phones, mobile phones, navigation devices, computers, laptop computers, digital broadcasting terminals, personal digital assistants (PDAs), portable multimedia players (PMPs), and table personal computers (PCs). For example, the user terminal 110 may communicate with the other user terminals 120 through 140 and/or the server 150 via the network 160 by using a wireless or wired communication method.

A communication method is not limited and may include not only a communication method using a communication network (for example, a mobile communication network, wired Internet, wireless Internet, or a broadcasting network) that may be included in the network 160, but also short distance wireless communication between devices. For example, the network 160 may include one or more arbitrary network from among networks such as a personal area network (PAN), a local area network (LAN), a campus area network (CAN), a metropolitan area network (MAN), a wide area network (WAN), a broadband network (BBN), and the Internet. Also, the network 160 may include one or more of network topologies including a bus network, a start network, a ring network, a mesh network, a star-bus network, and a tree or hierarchical network, but is not limited thereto.

The server 150 may be implemented as a computing device or a plurality of computing devices providing an instruction, a code, a file, content, a service, or the like by communicating with the plurality of user terminals 110 through 140 via the network 160.

For example, the server 150 may provide a file for installation of an application to the user terminal 110 accessed via the network 160. In this case, the user terminal 110 may install the application by using the file provided by the server 150. Also, the user terminal 110 may access the server 150 and receive a service or content provided by the server 150 according to control of an operating system (OS) or at least one program (for example, a browser or installed application) included in the user terminal 110. For example, when the user terminal 110 transmits, to the server 150, a content view request through the network 160 according to control of the application, the server 150 may transmit, to the user terminal 110, modified content generated by adding a marker to view target content to prevent a content leak, and the user terminal 110 may display the modified content according to control of the application. As another example, the server 150 may set a communication session for data exchange and route the data exchange between the plurality of user terminals 110 through 140 through the set communication session.

Figure 2:
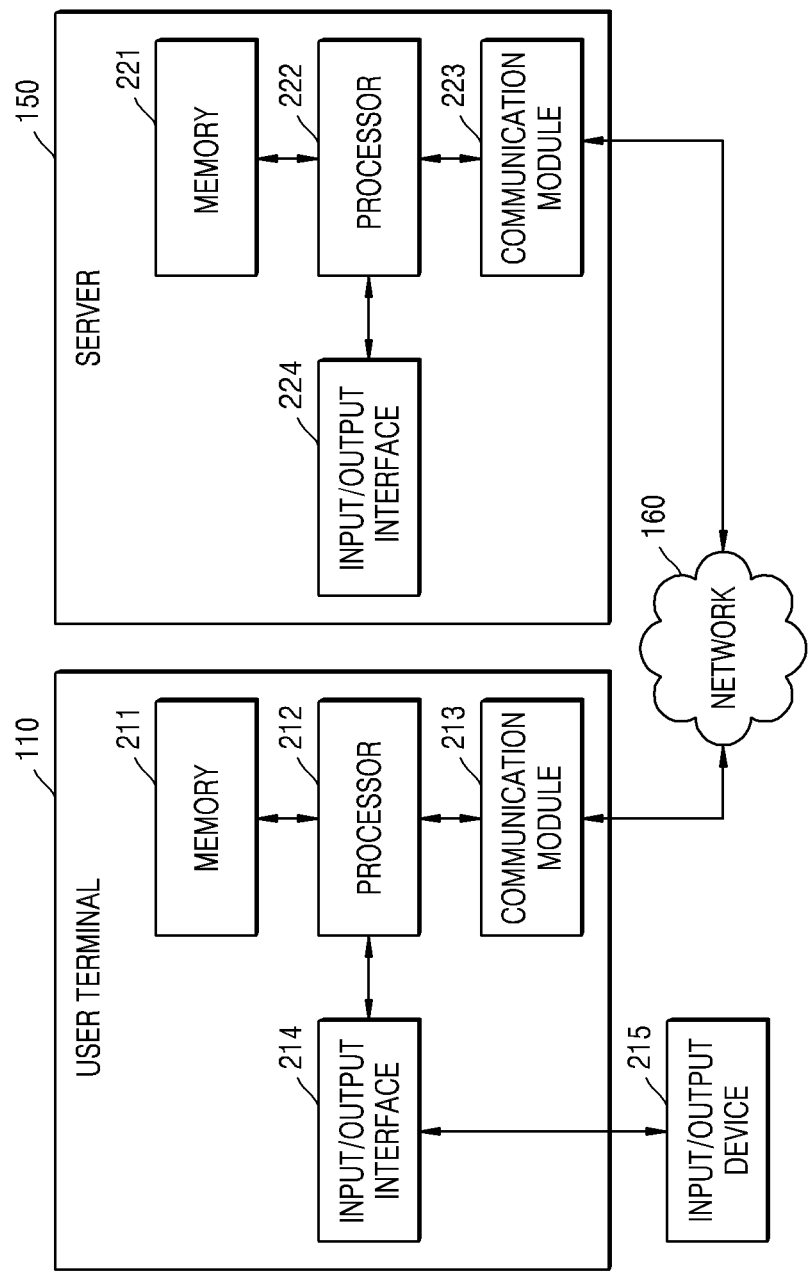
FIG. 2 is a block diagram of internal configurations of a user terminal and a server, according to an embodiment of the present disclosure.

FIG. 2 is a block diagram of internal configurations of a user terminal and a server, according to an embodiment of the present disclosure.

In FIG. 2, the user terminal 110 will be described as an example of one user terminal and an internal configuration of the server 150 will be described as an example of one server. The other user terminals 120 through 140 may have the same or similar internal configurations.

The user terminal 110 and the server 150 may include memories 211 and 221, processors 212 and 222, communication modules 213 and 223, and input/output interfaces 214 and 224. The memories 211 and 221 are computer-readable recording media, and may include random access memory (RAM), read-only memory (ROM), and a permanent mass storage device such as a disk drive. Also, the memories 211 and 221 may store an OS and at least one program code (for example, a browser installed and driven in the user terminal 110 or a code for the application described above). Such software components may be loaded from a computer-readable recording medium separate from the memories 211 and 221, by using a drive mechanism. Such a separate computer-readable recording medium may include a computer-readable recording medium such as a floppy drive, a disk, a tape, a DVD/CD-ROM drive, or a memory card. According to another embodiment, the software components may be loaded on the memories 211 and 221 through the communication modules 213 and 223, instead of the computer-readable recording medium. For example, at least one program may be loaded on the memories 211 and 221 based on a program (for example, the above-described application) installed by files provided by developers or a file distribution system (for example, the server 150) distributing an application installation file, through the network 160.

The processors 212 and 222 may be configured to process an instruction of a computer program by performing basic arithmetic, logic, and input/output operations. The instruction may be provided to the processors 212 and 222 by the memories 211 and 221 or the communication modules 213 and 223. For example, the processors 212 and 222 may be configured to execute a received instruction according to a program code stored in recording devices, such as the memories 211 and 221.

The communication modules 213 and 223 may provide a function enabling the user terminal 110 and the server 150 to communicate with each other through the network 160, and may provide a function for communicating with another user terminal (for example, the user terminal 120 or another server (for example, the server 150). For example, a request generated by the processor 212 of the user terminal 110 according to a program code stored in a recording medium, such as the memory 211 may be transmitted to the server 150 through the network 160, according to a control of the communication module 213. On the other hand, a control signal, an instruction, content, or a file provided according to a control of the processor 222 of the server 150 may be transmitted to the user terminal 110 through the communication module 213 of the user terminal 110 via the communication module 223 and the network 160. For example, the control signal, the instruction, or the like of the server 150 received through the communication module 213 may be transmitted to the processor 212 or the memory 211, and the content, the file, or the like may be stored in a storage medium that may be further included by the user terminal 110.

The input/output interfaces 214 and 224 may be a unit for an interface with an input/output device 215. For example, an input device may include a device such as a keyboard or a mouse, and an output device may include a device such as a display for displaying a communication session of an application. As another example, the input/output interface 214 may be a unit for an interface with a device in which functions for input and output are integrated, such as a touch screen. In detail, with respect to the processor 212 of the user terminal 110 processing an instruction of a computer program loaded on the memory 211, a service screen or content configured by using data provided by the server 150 or user terminal 120 may be displayed on a display via the input/output interface 214.

Also, according to other embodiments, the user terminal 110 and the server 150 may include more components than those shown in FIG. 2. However, there is no need to clearly illustrate most of components of the related art. For example, the user terminal 110 may be implemented to include at least some of the input/output device 215 described above or may further include other components, such as a transceiver, a global positioning system (GPS) module, a camera, various sensors, and a database.

Figure 3:
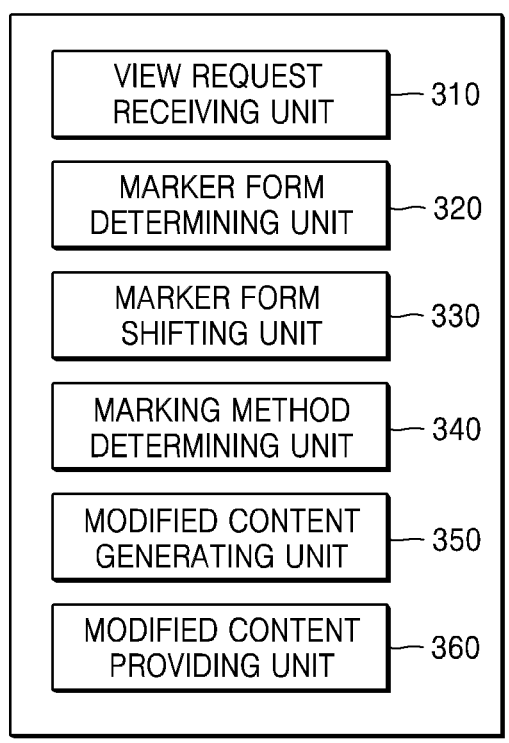
FIG. 3 illustrates an internal configuration of a processor, according to an embodiment of the present disclosure.

FIG. 3 illustrates an internal configuration of a processor, according to an embodiment of the present disclosure.

The processor 212 may include a web browser or application capable of receiving a webpage online and outputting the webpage. In the processor 212, a configuration for performing a function of preventing a content leak, according to an embodiment of the present disclosure, may include a view request receiving unit 310, a marker form determining unit 320, a marker form shifting unit 330, a marking method determining unit 340, a modified content generating unit 350, and a modified content providing unit 360, as shown in FIG. 3. According to an embodiment, the components of the processor 212 may be selectively included in or excluded from the processor 212. Also, according to an embodiment, the components of the processor 212 may be separated or combined for representation of functions of the processor 212.

Here, the components of the processor 212 may be representation of different functions of the processor 212, which are performed by the processor 212 according to an instruction (for example, an instruction provided by the web browser driven in the user terminal 110) provided by a program code stored in the user terminal 110.

Figure 4:
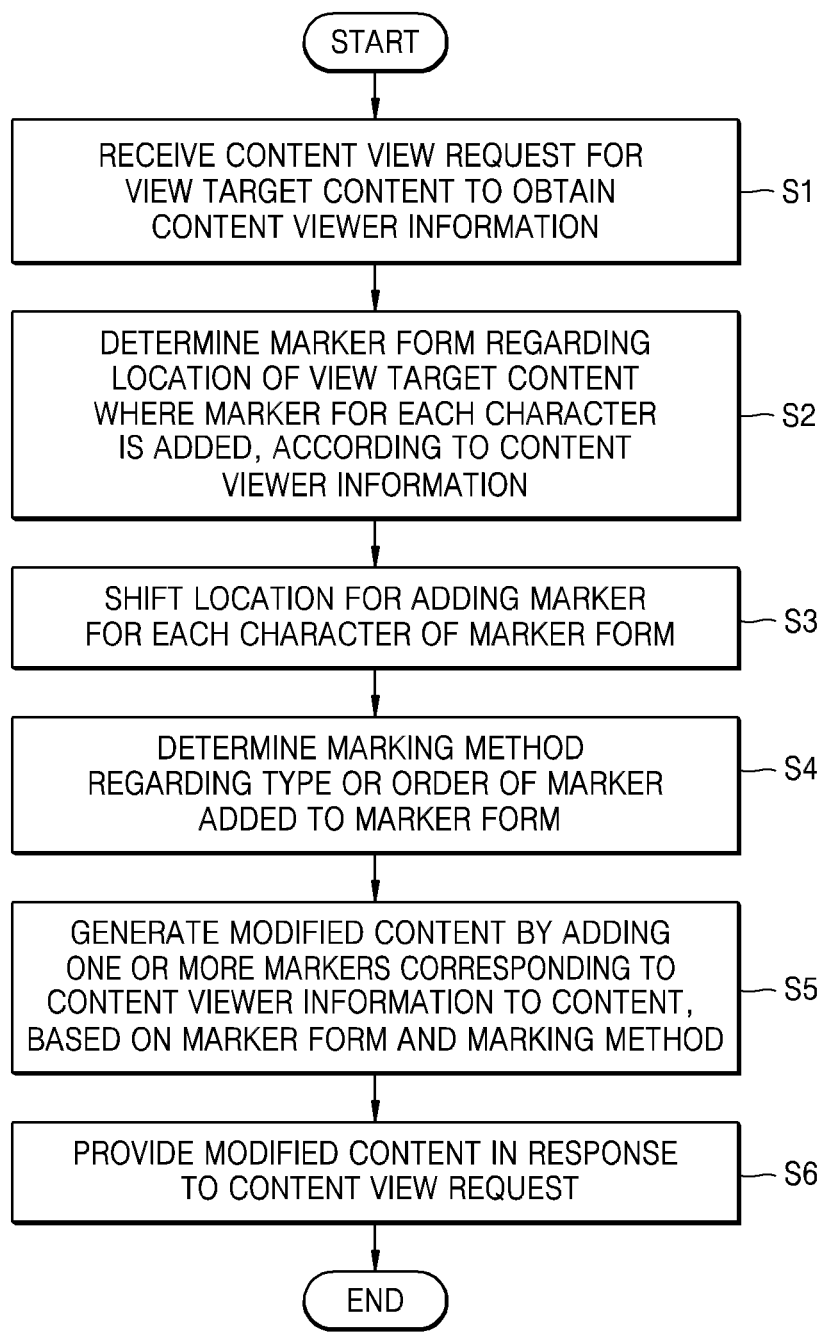
FIG. 4 is a diagram showing, in time-series, a method of preventing a content leak, according to an embodiment of the present disclosure.

The processor 212 and the components of the processor 212 may control the user terminal 110 to perform operations S1 through S6 included in a method of preventing a content leak of FIG. 4. For example, the processor 212 and the components of the processor 212 may be implemented to execute instructions according to a code of the OS or a code of the at least one program included in the memory 211.

FIG. 4 is a diagram showing, in time-series, a method of preventing a content leak, according to an embodiment of the present disclosure. Hereinafter, a method, system, and computer program for preventing a content leak, according to the present disclosure, will be described in detail with reference to FIGS. 3 and 4 together.

First, the view request receiving unit 310 receives a content view request including content viewer information (operation S1). Here, the content view request is received from a user and may be generated by the user selecting content desired to be viewed from a content list displayed on the user terminal 110. According to an embodiment of the present disclosure, target content of the content view request may be content including a cut. The content including a cut is content including one or more cuts configured of images, and representatively, may be cartoon content.

Also, the content viewer information denotes information about a user who transmitted the content view request. In particular, the content viewer information may include information for identifying the user who transmitted the content view request, and may include a user identification (ID). Here, the user ID may be an ID for identifying the user, which has been registered while subscribing to a content providing service of the present disclosure, and may be used by the user to log in for the content view request.

Meanwhile, the content view request received by the view request receiver 310 may not include the content viewer information. For example, the user may transmit the content view request without logging in. Here, the view request receiving unit 310 may Quest provide a login screen for the user to log in, and when the user performs log in, obtain the content viewer information. When the user does not log in, the view request receiving unit 310 may display, on the display of the user terminal 110, a notification that content is unable to be provided unless the user logs in.

Figure 5:
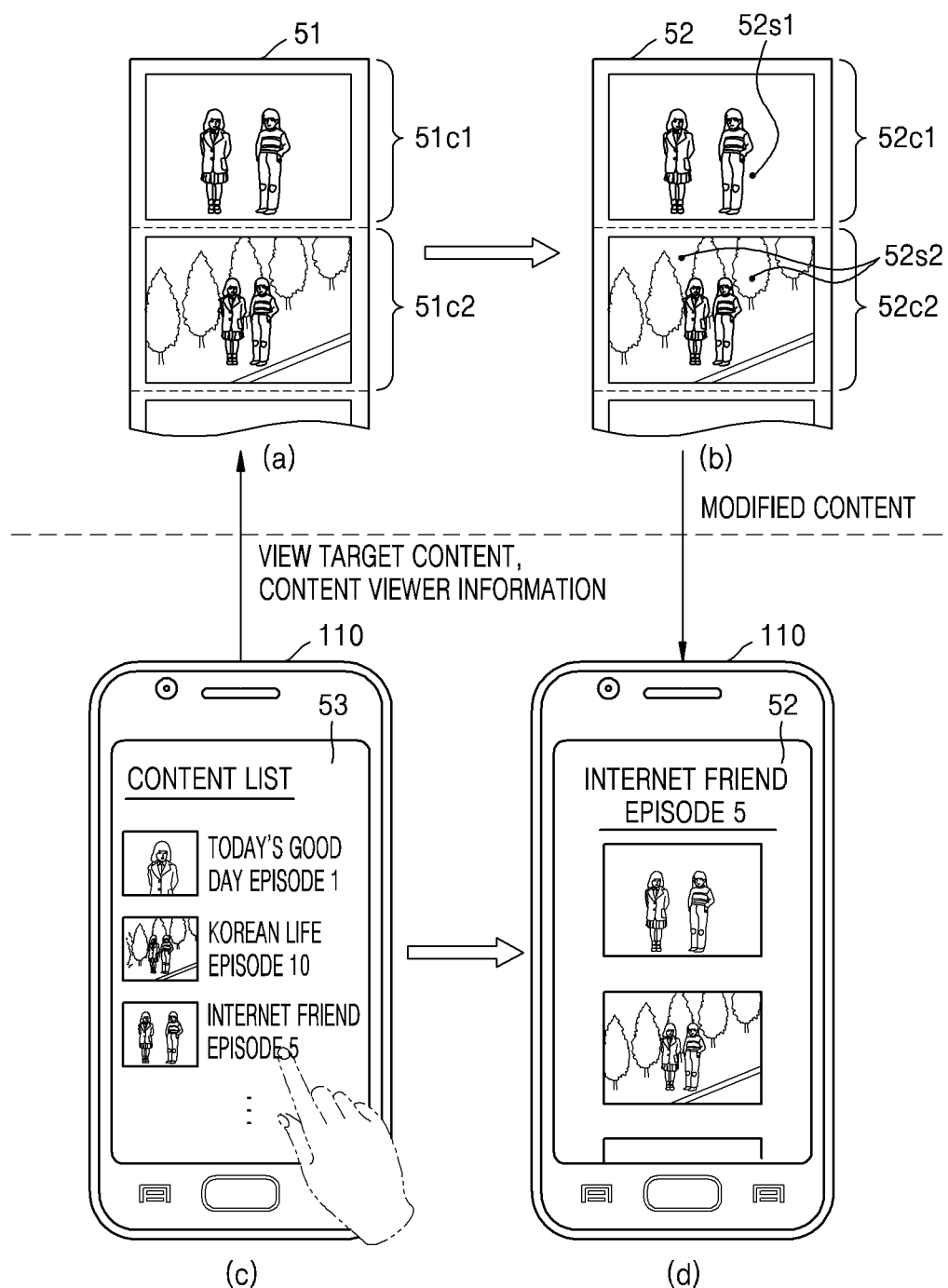
FIG. 5 illustrates an example of a method of providing content, according to an embodiment of the present disclosure.

FIG. 5 illustrates an example of a method of providing content, according to an embodiment of the present disclosure.

In the example of FIG. 5, (a) and (b) are for describing a method by which the processor 222 of the server 150 or the processor 212 of the user terminal 110 generates modified content by adding a marker to view target content, and (c) and (d) are examples of a display of a screen of the user terminal 110.

First, referring to (a) and (c) of FIG. 5, a user may select view target content 51 desired to be viewed from a content list 53. As described above, the view target content 51 of the present disclosure may be content including cuts 51c1 and 51c2, and each piece of content may be an episode of series content. For example, in the content list 53 of FIG. 5, "Internet Friend Episode 5" may be content of a 5th episode of series content including episodes 1 to 5. The user may select "Internet Friend Episode 5" as the view target content 51 among displayed pieces of content, and the view request receiving unit 310 may receive information about the selected view target content 51 and content viewer information.

Then, the processors 212 and 222 may generate modified content 52 from the view target content 51. Markers 52s1 and 52s2 may be added respectively to cuts 52c1 and 52c2 of the modified content 52. The modified content may be displayed on the user terminal 110 as shown in (d) of FIG. 5. A method of generating the modified content 52 will be described in detail below. According to an embodiment of the present disclosure, the markers 52s1 and 52s2 indicate content viewer information, and thus even when the user stores and captures the modified content 52 displayed on the user terminal 110 and leaks the modified content 52, information about a leaker may be obtained by looking at leaked content.

Next, the marker form determining unit 320 may determine a marker form regarding a location of the view target content where a marker for each character is added, according to the content viewer information (operation S2). Here, the marker added to the view target content may be an identification marker displayed to indicate information about a viewer on the view target content. Here, the same marker form may be applied to all cuts in one piece of view target content. For example, when one piece of view target content includes 20 cuts, the same marker form may be applied to the 20 cuts. On the other hand, different marker forms may be applied to a same piece of view target content for each viewer or whenever a viewing time varies even for a same viewer.

In detail, the marker form is a form for storing a location where a marker for each character is added to the cuts of the view target content. A type of the marker form is not limited as long as a marker location for each character corresponding to each of characters is included. The marker location each character may be a location where one or more markers are displayed according to each character. Here, characters with the marker location may be alphabets, numbers, and special characters that may be used for a viewer ID. Here, according to an embodiment of the present disclosure, marker locations for each character corresponding to characters may be sequentially assigned to the marker form. For example, when there are a plurality of marker locations in the marker form, the marker locations corresponding to a through z, 0 through 9, or special characters may be sequentially assigned from left to right or from top to bottom.

Although the marker form according to the present disclosure is not displayed or shown on the view target content, the marker form may function as a standard form for determining the location for adding the marker to the view target content. In other words, according to the method of the present disclosure of preventing a content leak, the content viewer information may be displayed by overlapping the marker form on the view target content and adding a marker at a location of the view target content corresponding to the marker location of the marker form. Here, only a marker is displayed on modification target content and the marker form is not shown.

According to a selective embodiment of the present disclosure, the marker form determining unit 320 may generate a plurality of marker forms and select one of the plurality of marker forms. For example, the marker form determining unit 320 may randomly select the marker form or may determine to apply a marker form different from that previously used, to the view target content by referring to a view history of the viewer. The marker form determining unit 320 may record a method of adding a determined marker on the view history of the corresponding viewer. The view history may be used to backtrack which viewer leaked content by looking at leaked content.

According to a selective embodiment of the present disclosure, the marker form may include not only the marker location for each character, but also a marker location for each attribute related to attributes of the view target content. For example, the marker form may include a marker location related to an image type attribute among the attributes of the view target content, and a marker location displaying whether the image type attribute is a horizontal type and a marker location displaying whether the image type attribute is a vertical type may be assigned.

According to a selective embodiment of the present disclosure, there may be one or a plurality of marker locations corresponding to characters or attributes in the marker form. For example, according to the marker form, a marker location indicating a character 'a' may be one dot or a plurality of dots.

According to a selective embodiment of the present disclosure, a boundary of the marker form may match a boundary of the cut. In other words, the size of the marker form and the size of the cut may be the same. Also, according to another selective embodiment of the present disclosure, the boundary of the marker form may be formed inside the cut such that the boundary of the marker form is spaced apart from the boundary of the cut by a pre-set value or greater. In other words, there may be an empty space equal to or greater than a certain size between the boundary of the marker form and the boundary of the cut because the size of the marker form is smaller than the size of the cut. Here, the marker form may be arranged such that a location of a center point of the marker form and a location of a center point of the cut match each other. This is to prevent a marker from being added to a certain region of an outer portion of a cut because an outer portion of content is mostly lost when leakers leak the content.

FIGS. 6 through 9 illustrate marker forms according to embodiments of the present disclosure.

Figure 6:
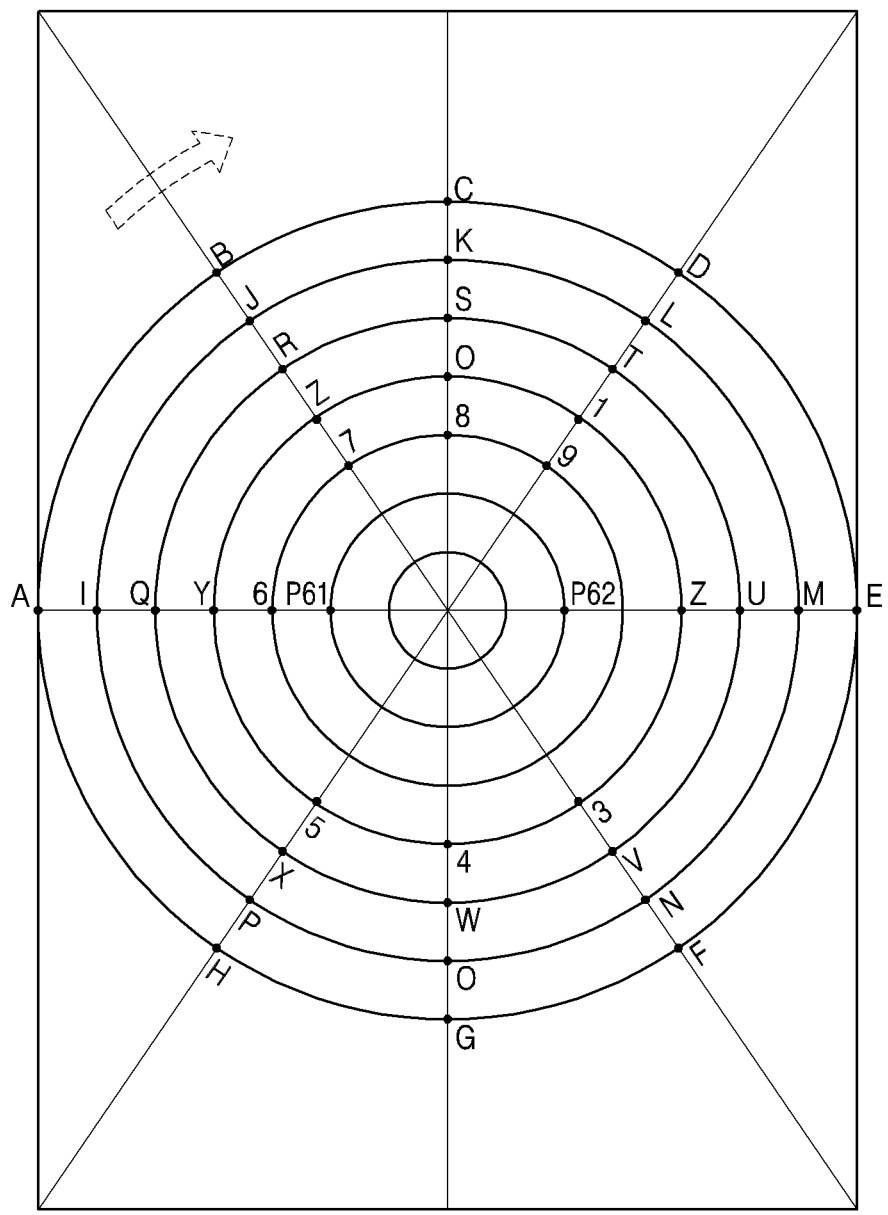
FIGS. 6 through 9 illustrate marker forms according to embodiments of the present disclosure.

FIG. 6 illustrates a marker form that has circular figures having different sizes and a same center and has, as locations of markers respectively corresponding to characters, points where diagonal lines and a horizontal line crossing a cut, and the circular figures intersect each other. In the embodiment of FIG. 6, intervals between circles may be the same. For example, in the embodiment of FIG. 6, marker locations for each character may be assigned in a clockwise direction sequentially from a left intersection of an outermost circle, and when the marker locations for each character are assigned to all intersections of the outer circle, the marker locations may be assigned in a same manner from an adjacent inner circle. As such, locations of A through Z and 0 through 9 may be sequentially determined. In FIG. 6, although marker locations such as special characters (-, _, and the like) are not displayed, a marker location for each special character may also be determined in the above manner.

In detail, in the marker form of FIG. 6, a through z may be assigned in a clockwise direction from an outer intersection. Then, numbers from 0 through 9 may be continuously assigned. In addition, attribute locations p61 and p62 indicating a horizontal image or a vertical image may be continuously assigned. For example, when a character 'c' is to be shown by using the marker form of FIG. 6, a marker may be added to a location of a cut of view target content corresponding to C. In other words, in FIG. 6, A through Z may be assigned as locations of markers corresponding to characters 'a' through 'z', 0 through 9 may be assigned as locations of markers corresponding to characters '0' through '9', and p61 and p62 may be assigned as locations of markers indicating a horizontal cut attribute or vertical cut attribute.

The embodiment of FIG. 6 is an example of a marker form of a vertical cut in which a length is longer than a width, but according to another embodiment of the present disclosure, a marker form of a horizontal cut in which a width is longer than a length may be formed in a same manner as FIG. 6.

Figure 7:
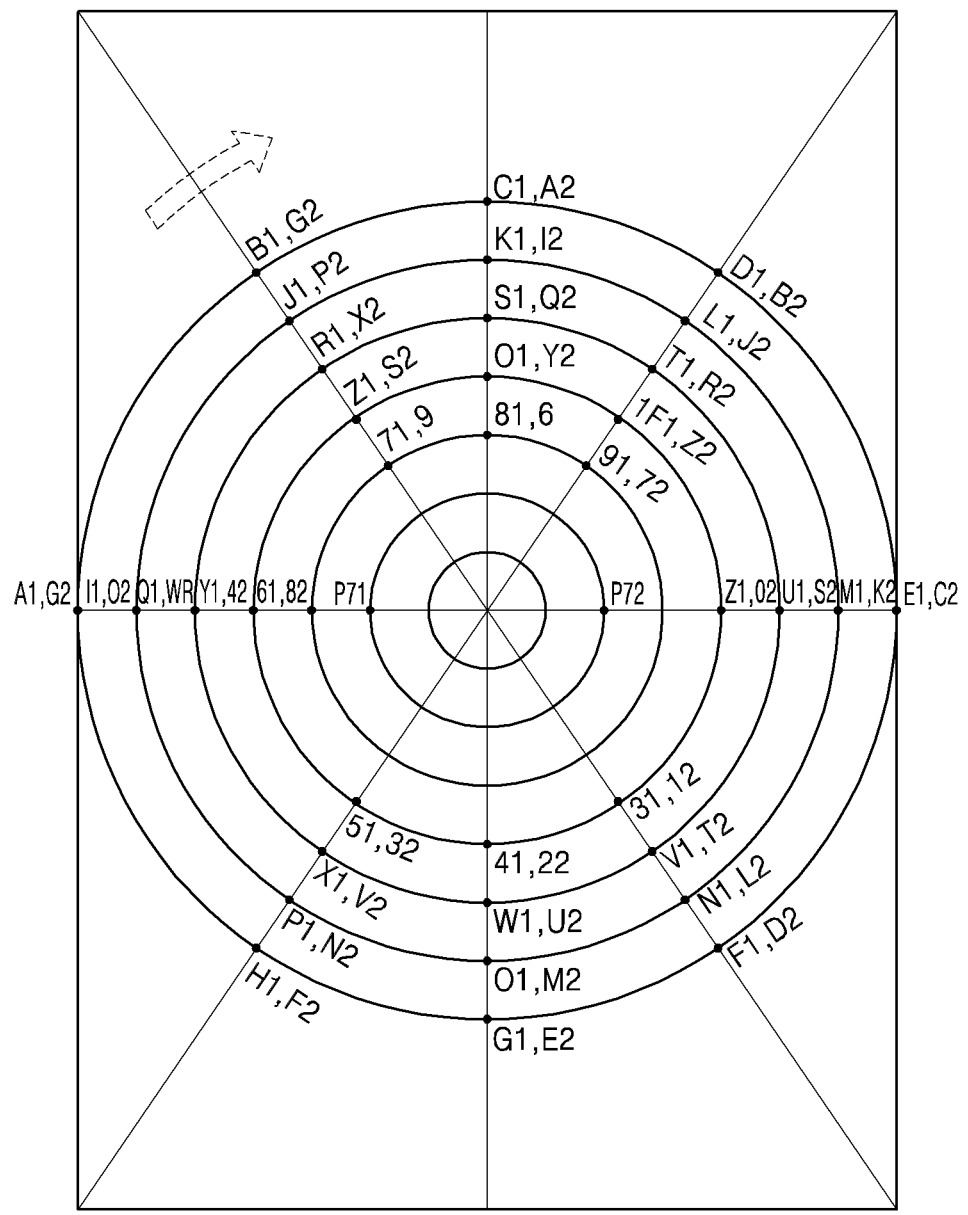

FIG. 7 illustrates a marker form according to another embodiment of the present disclosure.

FIG. 7 illustrates a marker form that has circular figures like FIG. 6, wherein two points are assigned as a location of a marker corresponding to each character, based on points where diagonal lines and a horizontal line crossing a cut, and the circular figures intersect each other. In detail, referring to the embodiment of FIG. 7, markers may be assigned to locations corresponding to A1 and A2 according to a character 'a'. In other words, a location of A1 and G2 may be a location where a marker is added when a character 'a' or 'g' is indicated. In other words, according to the marker forms of FIGS. 6 and 7, locations and number of markers for indicating a same character may vary.

Figure 8:
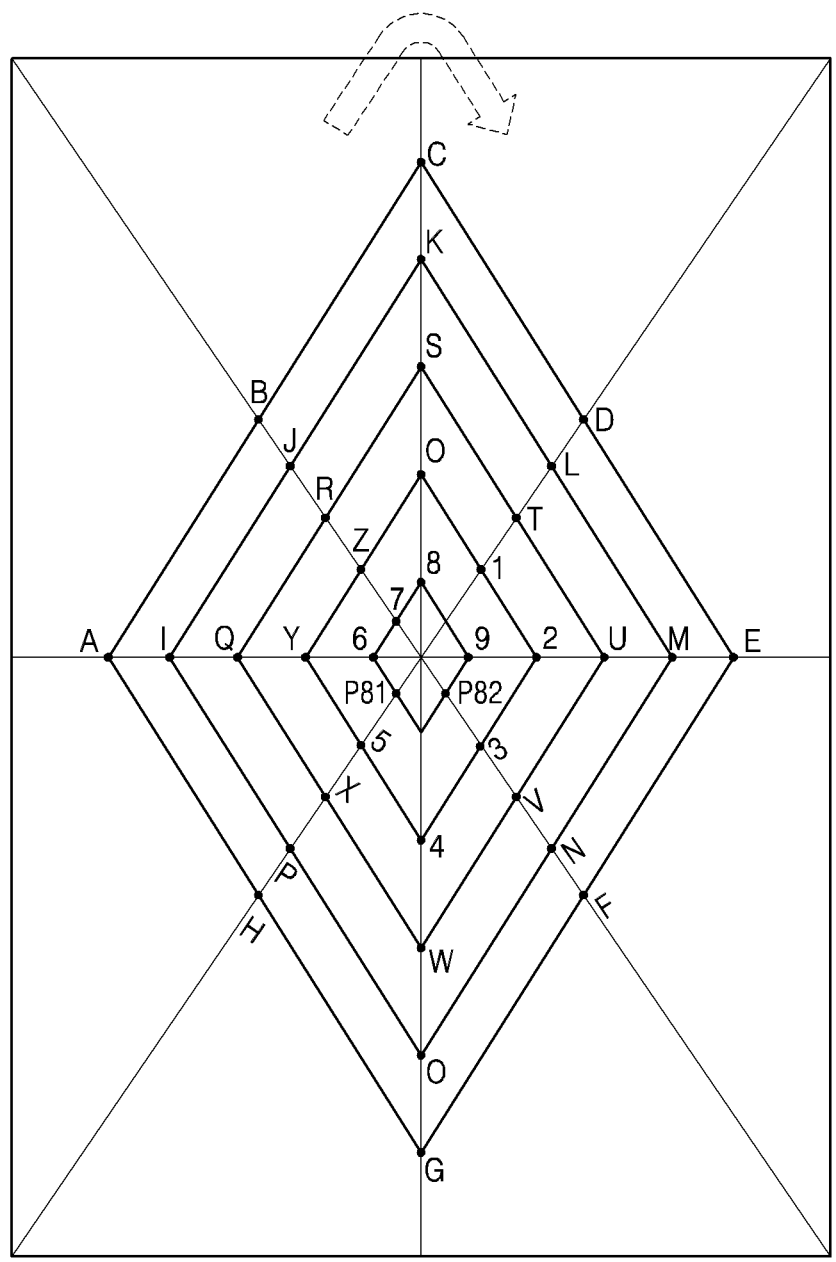

FIG. 8 illustrates a marker form according to another embodiment of the present disclosure.

FIG. 8 illustrates a marker form that has rhombic figures having different sizes and a same center and is based on points where diagonal lines and a horizontal line crossing a cut, and the rhombic figures intersect each other. In FIG. 8, A through Z may be assigned as locations of markers corresponding to characters 'a' through 'z', 0 through 9 may be assigned as locations of markers corresponding to characters '0' through '9', and p81 and p82 may be assigned as locations of markers indicating a horizontal cut attribute or vertical cut attribute.

Figure 9:
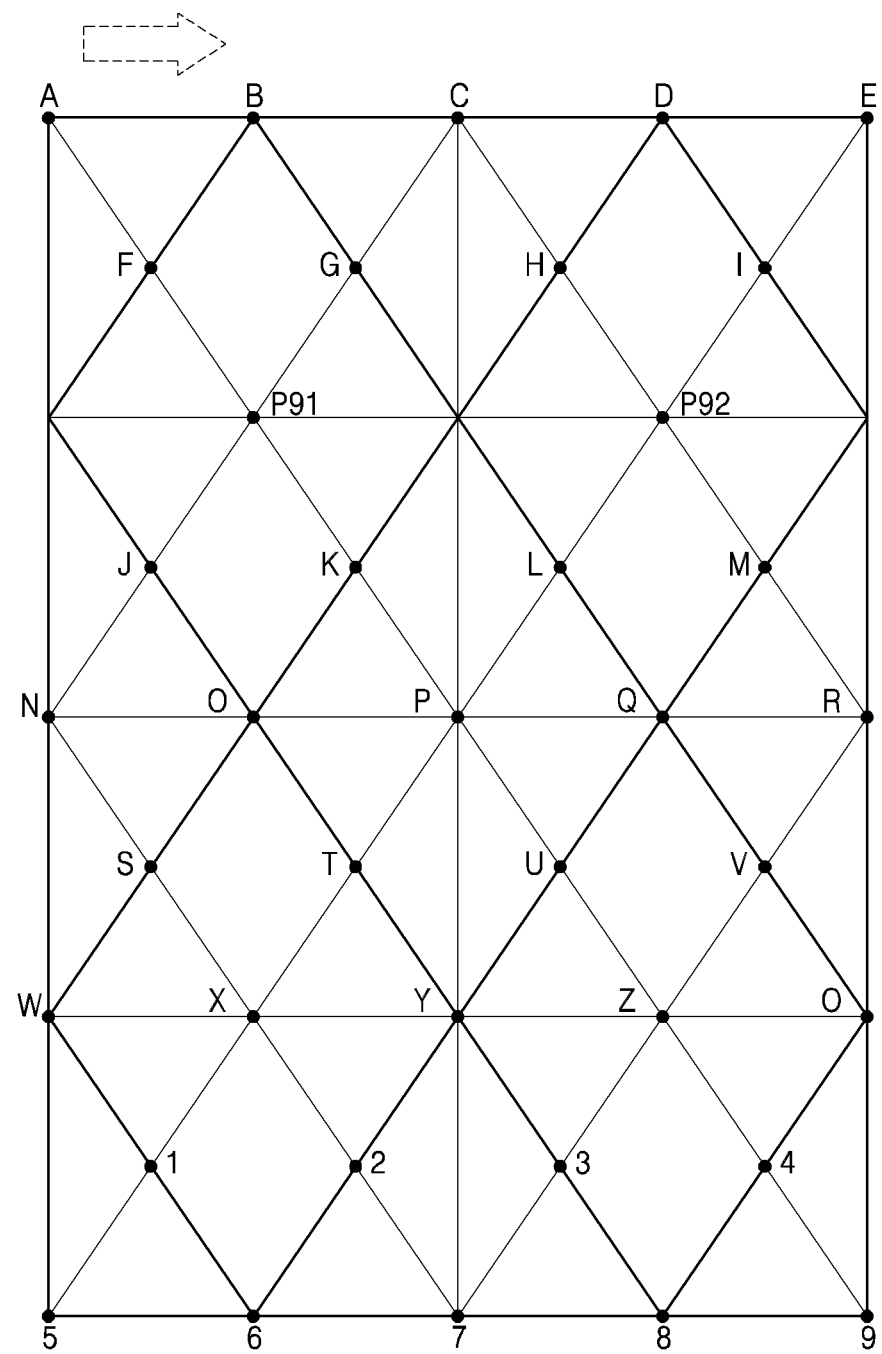

FIG. 9 illustrates a marker form according to an embodiment of the present disclosure.

FIG. 9 illustrates a marker form based on points where a horizontal line, a vertical line, and diagonal lines crossing a cut intersect each other. Similarly, in FIG. 9, A through Z may be assigned as locations of markers corresponding to characters 'a' through 'z', 0 through 9 may be assigned as locations of markers corresponding to characters '0' through '9', and p91 and p92 may be assigned as locations of markers indicating a horizontal cut attribute or vertical cut attribute.

In addition to the embodiments described above, marker forms having locations corresponding to characters may be unlimitedly used as the marker form of the present disclosure. In other words, FIGS. 6 through 9 illustrate the marker forms using intersections of straight lines and radial figures, but a grid shape using intersections between vertical and horizontal straight lines, a random shape in which a location for a character is randomly determined, and a user-defined shape in which a location for a special character is determined by a user setting may be used as a marker form.

Next, the marker form shifting unit 330 may shift the location for adding the marker for each character of the determined marker form (operation S3). As described above, according to an embodiment of the present disclosure, the location for adding the marker may be assigned for each character in the marker form. However, when a same marker form is repeatedly used, there is a possibility that a leaker may recognize a portion of content where a marker is added and erase the marker. For example, when the marker form of FIG. 6 is repeatedly used, the leaker may identify that a marker is added to a same location for each content viewed by him/herself, and thus erase the marker of the content. To prevent this, according to an embodiment of the present disclosure, a same marker form may be used while shifting a location for adding a marker for each character to change a method of adding a marker, thereby preventing the leaker from easily tracking the marker.

As described above, according to an embodiment of the present disclosure, the marker form determining unit 320 may determine the marker form by sequentially assigning the marker locations according to a specific order. For example, in the embodiment of FIG. 6, the marker locations for each character may be assigned in a clockwise direction sequentially from a left intersection of an outermost circle, and when the marker locations for each character are assigned to all intersections of the outer circle, the marker locations may be assigned in a same manner from an adjacent inner circle. As such, locations of A through Z and 0 through 9 may be sequentially determined. At this time, a point of A is moved to an existing location of C by shifting the point of A by 2, and other locations may be sequentially moved by 2 spaces each.

According to an embodiment of the present disclosure, the marker form shifting unit 330 may shift the location for adding the marker by 1 space or 2 spaces. When it is assumed that the locations for adding the markers are shifted by 3 spaces each in the marker form of FIG. 6, A may be shifted to a place of D, B may be shifted to a place of E, C may be shifted to a place of F, and other characters may be sequentially shifted.

According to a selective embodiment of the present disclosure, when the view target content is content of one episode of series content, the marker form shifting unit 330 may determine a shift value for shifting the location for adding the marker for each character, based on an episode number of the content. For example, when the view target content is a part of the series content and is content of a second episode, it may be determined that the marker location for adding the marker is shifted by 2. Alternatively, the marker location may be shifted by a remainder obtained by dividing an episode number of content by 5. For example, when the view target content is 12th episode, the marker location may be shifted by 2 that is a remainder obtained by dividing an episode number by 5.

Figure 10:
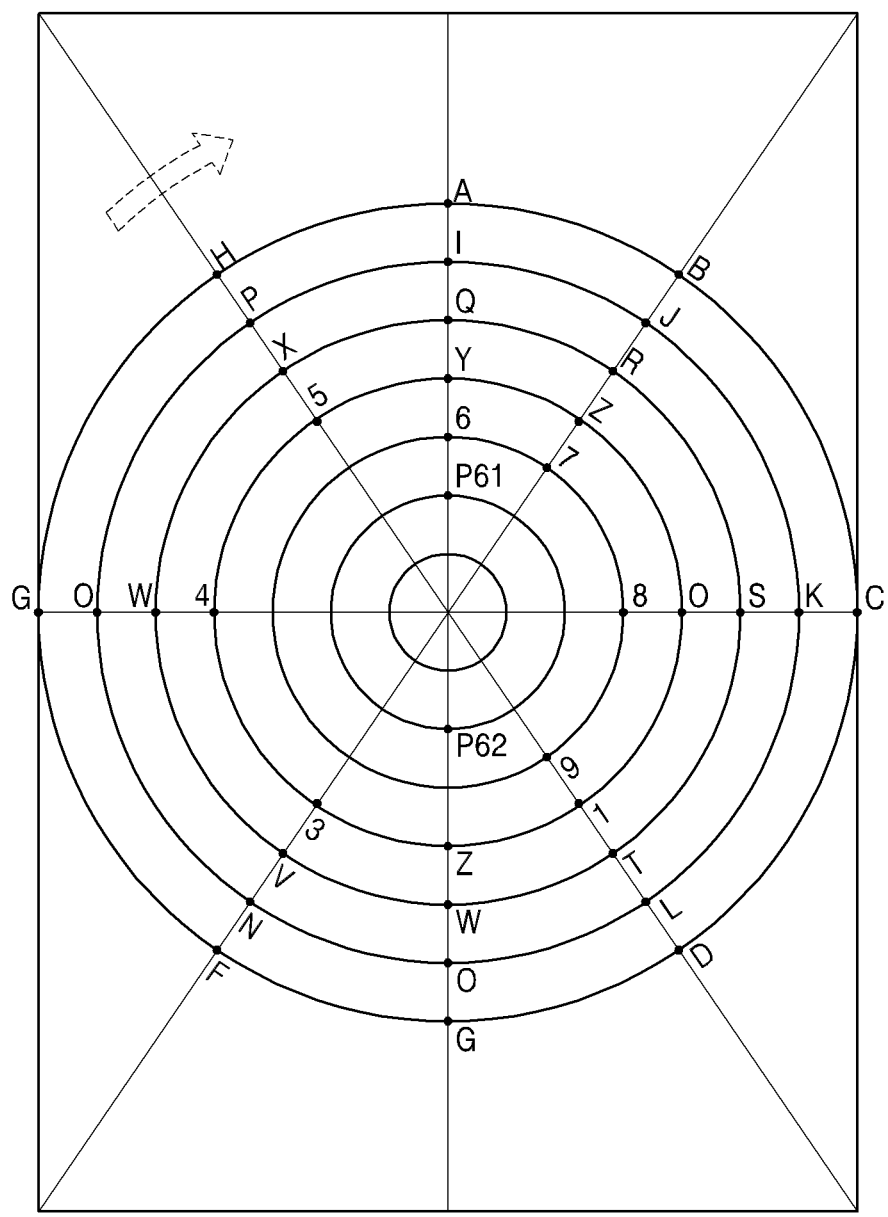
FIG. 10 illustrates an example in which a marker location shifted, according to an embodiment of the present disclosure.

FIG. 10 illustrates an example in which a marker location is shifted, according to an embodiment of the present disclosure.

Referring to FIG. 10, a marker form in which the marker locations of the marker form of FIG. 6 are shifted by 2 spaces. In other words, locations of C, D, and E are changed to locations of A, B, and C, respectively, in the marker form of FIG. 6. When the marker form is shifted as such, a marker is added to another location in response to same content viewer information, a possibility of a viewer detecting or removing a marker may be reduced.

Next, the marking method determining unit 340 may determine a marking method regarding a type or order of markers added to the marker form (operation S4). Here, the type of marker may include information about a shape, size, color of the marker. Also, the order of markers may be determined such as to add only a corresponding marker to one character per cut while adding a marker to a first cut of the view target content.

For example, the marking method determining unit 340 may determine the shape of the marker to various shapes, such as a square, a circle, or a rhombus. Also, when the shape is a square, the size of the marker may be determined to be 1×1 pixel, 2×2 pixel, 3×3 pixel, or the like.

Figure 11:
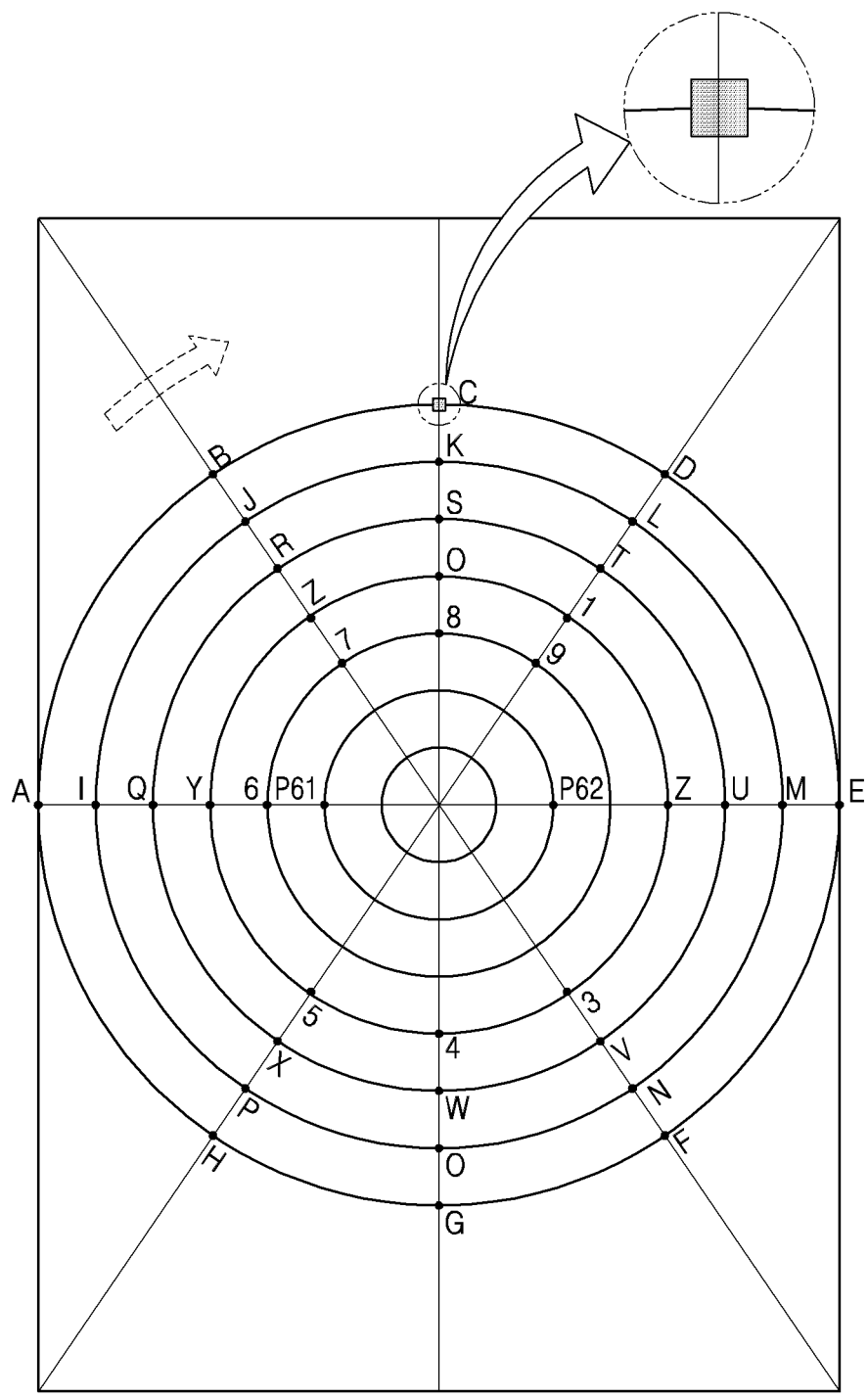
FIG. 11 illustrates an example of a marker type and a displayed mark, according to an embodiment of the present disclosure.

FIG. 11 illustrates an example of a marker type and a displayed mark, according to an embodiment of the present disclosure.

FIG. 11 illustrates an example in which a marker is added to C that is a location corresponding to a character 'c' in the marker form of FIG. 6. According to an embodiment of the present disclosure, the marker may have a shape of a square, a circle, a rhombus, or the like having a pre-set size. For example, as shown in FIG. 1, the marker may be a square having the area equal to or less than a pre-set value, as shown in FIG. 11. For example, the square having the area equal to or less than the pre-set value may be displayed at the location corresponding to C of a cut such that the character 'c' is indicated while making it difficult for a viewer to find the square.

Also, the marking method determining unit 340 may determine the color of the marker based on a color value of the view target content. In detail, the marking method determining unit 340 may consider a color of the view target content corresponding to the marker location when determining the color of the marker. Here, the marking method determining unit 340 may determine the intensity of change of the color of the marker compared to the view target content to a minimum value that will not disappear even when a color level is decreased. For example, the marking method determining unit 340 may determine an RGB color value of the marker to a value obtained by subtracting a pre-set value from an RGB color value of the view target content corresponding to the marker location. This is to determine the color of the marker similarly to a surrounding color such that the viewer is unable to easily detect the marker because it is highly likely for the viewer to recognize the marker when a difference between the color of the marker and the color of the view target content at the corresponding location is large.

According to a selective embodiment of the present disclosure, the marking method determining unit 340 may determine the RGB color value of the marker to be a value obtained by subtracting a value corresponding to a pre-set ratio from the original RGB color value of the view target content corresponding to the marker location. Here, the pre-set ratio may be set such that a color difference between the marker and a surrounding portion is clearly shown when compared with original content while a viewer of modified content is unable to easily see the marker. However, when a negative value is obtained when subtracting the value corresponding to the pre-set ratio from the original RGB color value, the value corresponding to the pre-set ratio may be added to the original RGB color.

Also, the marking method determining unit 340 may determine the order of adding the markers. According to a selective embodiment of the present disclosure, the marking method determining unit 340 may determine to add markers respectively corresponding to characters included in the content viewer information sequentially to the cuts of the view target content. Also, according to an embodiment of the present disclosure, the marker may not be added to a first cut of the view target content. This is because the first cut may be highly likely to be a cut displaying informational content, such as a copyright warning image, or an empty cut.

According to a selective embodiment of the present disclosure, the marking method determining unit 340 may determine to repeatedly add the markers. For example, when a marker character string corresponding to the content viewer information is 'wt1004', the order of markers may be determined such that markers corresponding to 'w', 't', '1', '0', '0', and '4' may be sequentially displayed on second through seventh cuts, the markers corresponding to 'w', 't', '1', '0', '0', and '4' may be sequentially added from eighth through thirteenth cuts, and then the same is repeated for remaining cuts.

In addition, when the markers corresponding to the content viewer information are repeatedly added, the marking method determining unit 340 may determine the order of markers such that there is a cut to which a marker is not added for each repetition. For example, in the above example, a process in which the markers corresponding to 'w', 't', '1', '0', '0', and '4' are displayed on second through seventh cuts, a marker is not added to an eighth cut, the markers are added again from nineth through fourteenth cuts, and a marker is not added to fifteenth cut may be repeated.

Next, the modified content generating unit 350 generates the modified content by adding the one or more markers corresponding to the content viewer information to the content, based on the marker form and the marking method (operation S5). According to an embodiment of the present disclosure, the modified content generating unit 350 may generate a marker target character string for generating the marker based on the content viewer information.

The marker target character string is a character string substantially converted into a marker to indicate the content viewer information by being added to the view target content, and any character string including identification information for identifying the content viewer information may be unlimitedly used as the marker target character string of the present disclosure. According to an embodiment of the present disclosure, the marker target character string is identification information regarding the viewer, and may include a rental number of the viewer, ID of the viewer, and a nickname of the viewer. In addition, according to an embodiment of the present disclosure, the marker target character string may additionally include additional information regarding the identification information itself. For example, the marker target character string may be 06wt1004 in which 'wt1004' that is a rental number as the identification information of the viewer and '06' that is a number of characters in the rental number as the additional information regarding the identification information itself are combined.

The modified content generating unit 350 may add the marker corresponding to the generated marker character string to the view target content according to the marker form and the marking method determined by the marker form determining unit 320 and the marking method determining unit 340. In detail, the modified content generating unit 350 may add, to each of the plurality of cuts included in the view target content, the mark corresponding to each character included in the marker target character string based on the content viewer information. For example, when the marker target character string is 'abcde', markers corresponding to 'a', 'b', 'c', 'd', and 'e' may be added one by one for each cut, sequentially to first through fifth cuts of the view target content.

Figure 12:
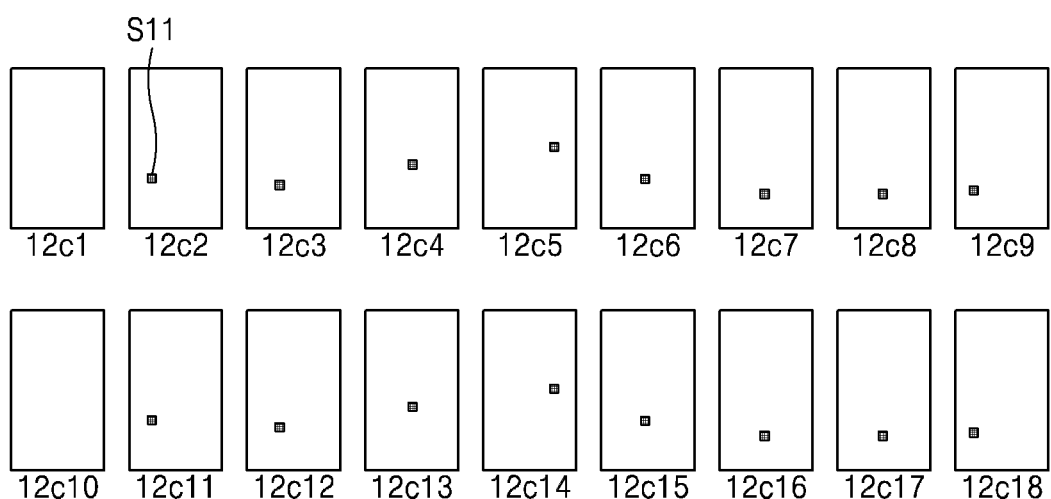
FIG. 12 illustrates an example of modified content generated according to an embodiment of the present disclosure.

FIG. 12 illustrates an example of modified content generated according to an embodiment of the present disclosure.

Referring to FIG. 12, the modified content including a first cut 12c1 through 18th cut 12c18 is illustrated. FIG. 12 illustrates an example of modified content that may be generated when a marker character string is '06wt1004'. Also, the first cut 12c1 through the 18th cut 12c18 may be sequential cuts generated by one piece of view target content. First, a marker may not be added to the first cut 12c1. A marker S11 may be added to a location of the second cut 12c2 corresponding to '0' of a marker form. In the same manner, markers corresponding to '6', 'w', 't', '1', '0', '0', and '4' may be respectively added to the third cut 12c3 through the ninth cut 12c9. As shown in FIG. 12, locations of markers corresponding to different characters of the marker target character string may be different. In other words, when the modified content includes the plurality of cuts 12c1 through 12c18, a marker corresponding to one character may be added to each of the plurality of cuts, wherein the marker may be added to a location corresponding to the marker target character string. Meanwhile, no marker may be added to the tenth cut 12c10. Continuously, like the first cut 12c1 through ninth cut 12c9, the markers corresponding to '06wt1004' may be added to the 11th cut 12c11 through 18th cut 12c18.

Lastly, the modified content providing unit 360 provides the modified content to the user in response to the content view request (operation S6). The provided modified content is displayed on a user screen as shown in (d) of FIG. 5. Because content provided to the viewer itself is the modified content, even when the viewer leaks the modified content by storing or capturing the modified content, it may be verified who leaked the content.

In a selective embodiment, according to an embodiment of the present disclosure, the modified content providing unit 360 may provide the modified content to which the marker is added only for content paid by the viewer. When the content is not paid, for example, when the content can be viewed for free, the modified content providing unit 360 may provide original content instead of the modified content. In this regard, the modified content providing unit 360 may provide a platform requesting a user to pay upon receiving a view request, and the modified content generating unit 350 may generate the modified content based on the content viewer information only after payment is made. Because the present disclosure aims at detecting the leaker, the modified content may be generated and provided only for paid content and the leaker may be detected by using the marker added to the modified content when the paid content is leaked without permission.

The embodiments according to the present disclosure described above may be implemented in a form of a computer program executable by various components on a computer, and such a computer program may be recorded in a computer-readable medium. Here, the medium may continuously store computer-executable programs, or store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

Hereinabove, the present disclosure has been described by specific matters such as specific elements and limited embodiments and drawings, but these are provided only to help more general understanding of the present disclosure. The present disclosure is not limited to the above embodiments and anyone with ordinary knowledge in the technical field to which the present disclosure belongs may make various modifications and changes from these descriptions.

Therefore, the spirit of the present disclosure should not be determined limitedly based on the above-described embodiments, and not only the appended claims but also all ranges equivalent to or equivalently changed from the claims are within the scope of the spirit of the present disclosure.

The invention claimed is:

1. An apparatus for preventing a content leak, the apparatus comprising:
   a memory for storing instructions; and
   a processor having a plurality of functional units for executing the instructions stored in the memory, the functional units including:
   a view request receiving unit for receiving a content view request for viewing target content having a series of cuts, and obtaining content viewer information;
   a marker form determining unit for determining a marker form defining marking locations respectively corresponding to characters, according to the target content;
   a marking method determining unit for determining a marking method regarding a shape and size of markers to be added to the target content; and
   a modified content generating unit for generating a marking character string based on the content viewer information, and generating modified content by adding, in sequence, the marker to one cut of at least some of the series of cuts of the target content at the marking location corresponding to one character of the marking character string, based on the marker form and the marking method.

2. The apparatus of claim 1, further comprising a marker form shifting unit for shifting the marking locations of the marker form.

3. The apparatus of claim 2, wherein a value for shifting the marking locations is determined based on an episode number of the target content.

4. The apparatus of claim 1,
wherein the marking character string includes a viewer identification of a viewer, the viewer requesting for viewing the target content.

5. The apparatus of claim 1, wherein a boundary of the marker form is spaced apart from a boundary of one of the series of cuts of the target content by a pre-set value or greater such that a size of the marker form is smaller than a size of the one of the series of cuts of the view target content.

6. The apparatus of claim 1, wherein a color of one of the markers is determined based on a color value of a pixel at the marking location in a corresponding cut of the series of cuts of the target content where the one of the markers added.

7. The apparatus of claim 1, wherein the marker form further defines attribution locations respectively corresponding to attributions of the target content.

8. The apparatus of claim 1, wherein the marker form defines two or more marking locations corresponding to each character.

9. The apparatus of claim 1, further comprising a modified content providing unit for providing the modified content in response to the content view request.

10. The apparatus of claim 1, wherein the markers added to the at least some of the series of cuts of the target content are the same shape and size.

11. A method of preventing a content leak, the method comprising:
receiving a content view request for viewing target content and obtaining content viewer information;
determining a marker form defining marking locations respectively corresponding to characters, according to the target content;
determining a marking method regarding a shape and size of markers to be added to the target content;
generating a marking character string based on the content viewer information; and
generating modified content by adding, in sequence, the marker to one cut of at least some of the series of cuts of the target content at the marking location corresponding to one character of the marking character string, based on the marker form and the marking method.

12. The method of claim 11, further comprising shifting the marking locations of the marker form based on an episode number of the target content.

13. The method of claim 11, wherein the marking character string includes a viewer identification of the viewer, the viewer requesting for viewing the target content.

14. The method of claim 11, wherein a color of one of the markers is determined based on a color value of a pixel at the marking location in a corresponding cut of the series of cuts of the target content where the one of the markers is added.

15. The method of claim 11, wherein the marker form is a marker form defines two or more marking locations corresponding to each character.

16. The method of claim 11, wherein the markers added to the at least some of the series of cuts of the target content are the same shape and size.

* * * * *